2 Sheets—Sheet 1.
W. W. GRIER.
Vehicle-Spring.
No. 212,217. Patented Feb. 11, 1879.
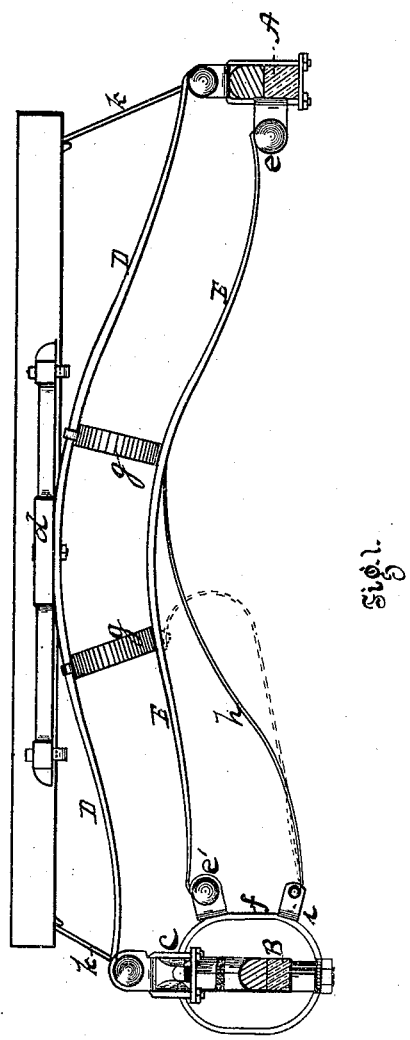
N. PETERS, PHOTO-LITHOGRAPHER, WASHINGTON, D. C.

W. W. GRIER.
Vehicle-Spring.
No. 212,217. Patented Feb. 11, 1879.
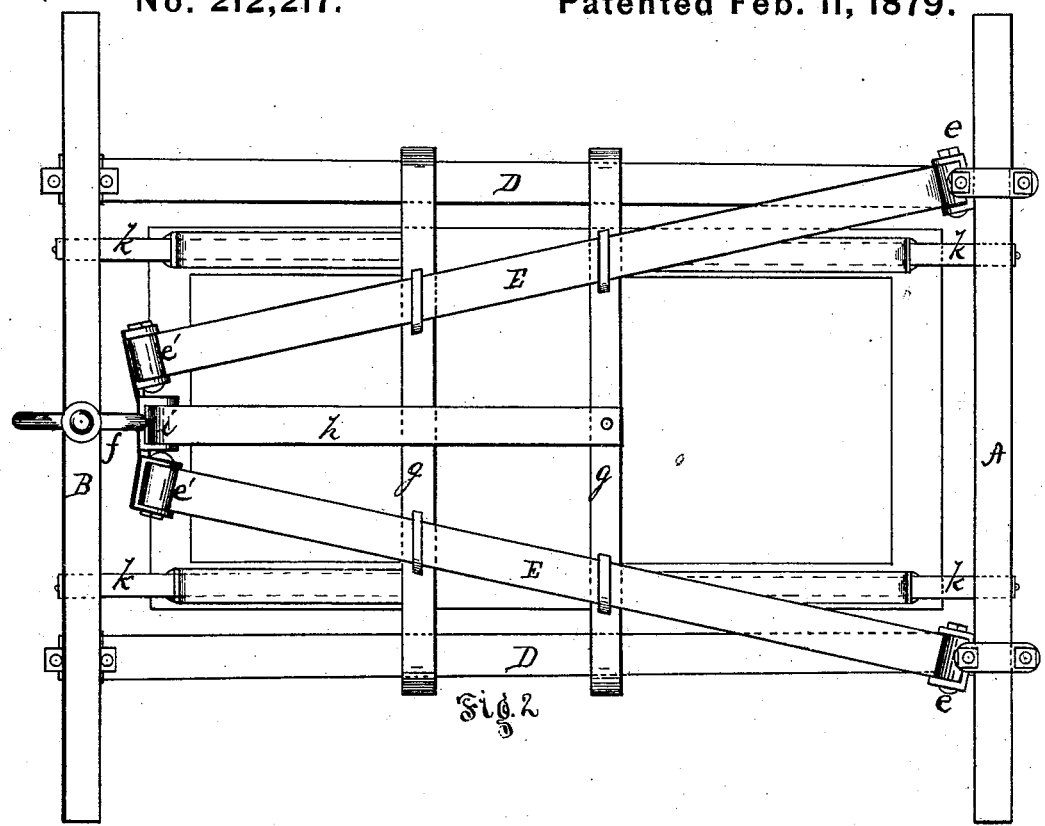
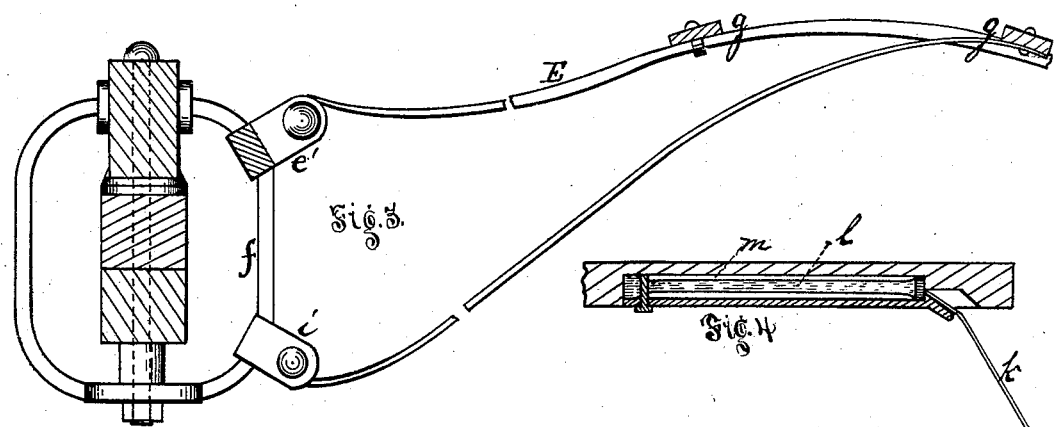
Witnesses.
R. C. Wrenshall
John K. Smith
Inventor.
William W. Grier
by Bakewell & Kerr
attys

UNITED STATES PATENT OFFICE.

WILLIAM W. GRIER, OF HULTON, PENNSYLVANIA.

IMPROVEMENT IN VEHICLE-SPRINGS.

Specification forming part of Letters Patent No. 212,217, dated February 11, 1879; application filed September 27, 1878.

*To all whom it may concern:*

Be it known that I, WILLIAM W. GRIER, of Hulton, in the county of Allegheny and State of Pennsylvania, have invented a new and useful Improvement in Vehicle Springs and Controllers; and I do hereby declare the following to be a full, clear, and exact description thereof, reference being had to the accompanying drawings, forming part of this specification, in which—

Figure 1 is a side elevation of devices embodying my invention. Fig. 2 is a bottom view of the same. Fig. 3 is an enlarged detail view of the auxiliary or front axle spring-brace. Fig. 4 is a sectional detail view of the bed-controllers.

Like letters refer to like parts wherever they occur.

My invention relates to vehicle-springs and devices for counteracting their action when desired; and it is especially applicable to "no-perch" vehicles, though generally useful in all vehicles of a light character.

At present in no-perch vehicles, as generally constructed, there is a tendency of the forward axle to rotate, which results in more or less strain being put on the king-bolt and on the forward connections of the springs, causing the same to become distorted, rendering the nuts, &c., liable to wear loose, and detracting greatly from the durability of the parts.

The object of the first part of my invention is to obviate these defects in no-perch vehicles; and to this end it consists in connecting the spring-strut or center-brace with the forward axle by means of an auxiliary or supplemental spring, or a rigid brace which shall take its spring from the strut, brace, or cross-bar.

In fast driving it is sometimes desirable to convert the vehicle into a practically no-spring vehicle—that is, rigidly connect the bed and running-gear. The object, therefore, of the second part of this invention is to control the vibration of the springs; to which end it consists in connecting the body or bed with the head-block or spring-bar and hind axle by straps or equivalent means, preferably arranged to connect or disconnect the parts at will.

The invention further consists in special constructions of the devices, as will hereinafter more fully appear.

I will now proceed to describe my invention, so that others skilled in the art to which it appertains may apply the same.

In the drawings, A indicates the hind axle, B the front axle, and C the head-block. Pivoted or clipped to the top part of the hind axle and head-block are the upper springs, D, which are arranged parallel in the same horizontal plane, and support the usual longitudinal bed-bars $d$. E E represent the lower springs, secured at their rear ends to the inner side of the rear axle by suitable clips, as at $e\ e$, and converging toward the inner face of the head-block, to which, or to the fifth-wheel yoke $f$, they may be connected by suitable clips, as at $e'$.

The springs D D and E E are arranged in different horizontal planes, and are connected at or near the middle by a rigid brace or strut—in the present instance composed of the curved bars $g\ g$—whereby the said springs are adapted to vibrate in unison.

In order to brace the front axle and prevent any twisting strain to its several connections, and to obviate any tendency to rotation when draft is made on the axle, I provide a supplemental or auxiliary brace-spring, $h$, which I connect at one end to the strut or brace $g\ g$, and by the opposite end to the front axle, B, (in which case it should be pivoted,) or preferably, as shown at $i$, to the yoke $f$ of the fifth-wheel, in either case (to obtain the best results) making the last-named attachment as low as or lower than the line of draft. This auxiliary or brace spring $h$ will, from its nature and relations, accommodate itself to the vibration of the springs D E. This brace $h$ may, however, be made rigid, instead of in nature of a spring, provided the parts $g$ be of such material as will compensate for the vibration, or other means, which will readily suggest themselves to a skilled mechanic, be substituted for the spring of a spring-brace.

In order to counteract any excessive vibrations of the springs under conditions before specified, I employ a series of controlling devices, preferably straps of strong leather, as at $k$, each strap fitted at one end with a spring, $l$, adapted to retract the strap, drawing it into a recess, m, in the bed when not in use, said straps also fitted at their free ends with loops or stirrups n, by means of which they may be made fast to the hind axle and head-block when in use.

At the point where the strap k is attached to the retracting-spring l the strap may be provided with a check-bar, or like means, to prevent undue strain being brought on the retracting-spring l. When in use these straps are drawn down and secured by the loops or stirrups n to hooks or pins o on the head-block and hind axle, and will serve to control the vibration of the springs.

Having thus set forth the nature and advantages of my invention, and specifically pointed out the best devices known to me for carrying the same into effect, what I claim, and desire to secure by Letters Patent, is—

1. In a no-perch vehicle, the combination, with two sets of springs arranged in different planes, and having a rigid central strut or brace, of an auxiliary spring or spring-brace, extending from the central strut to the connections of the front axle, and adapted to brace the front axle, substantially as specified.

2. The combination, with the bed, axle, and head-block of a spring-vehicle, of a set of devices, substantially as described, adapted to neutralize the action of the springs, rendering the connection between the body and gear practically rigid, said devices being provided with retracting-springs, substantially as and for the purpose specified.

In testimony whereof I, the said WILLIAM W. GRIER, have hereunto set my hand.

WILLIAM W. GRIER.

Witnesses:
R. H. WHITTLESEY,
F. W. RITTER, Jr.